United States Patent [19]

Rado et al.

[11] 4,125,385

[45] Nov. 14, 1978

[54] CYCLONE SEPARATOR FOR HIGH TEMPERATURE OPERATIONS WITH CORROSIVE GASES

[75] Inventors: Theodore A. Rado; Alan J. Morris, both of Oklahoma City, Okla.

[73] Assignee: Kerr-McGee Chemical Corporation, Oklahoma City, Okla.

[21] Appl. No.: 820,407

[22] Filed: Aug. 1, 1977

[51] Int. Cl.$^2$ ............................................. B01D 51/00
[52] U.S. Cl. ................................... 55/269; 55/459 R; 55/435; 165/140
[58] Field of Search .................................. 55/267–269, 55/435, 459 R; 209/144, 211; 165/140–142

[56] References Cited

U.S. PATENT DOCUMENTS

| 1,201,705 | 10/1916 | Day et al. ............................... 165/140 |
| 3,327,456 | 6/1967 | Guber et al. ............................. 55/269 |
| 3,470,678 | 10/1969 | Clark et al. .............................. 55/269 |

FOREIGN PATENT DOCUMENTS 88,927  3/1958  Netherlands ............................... 55/269

Primary Examiner—Bernard Nozick
Attorney, Agent, or Firm—William G. Addison

[57] ABSTRACT

This invention relates to an improved heat exchanger gas outlet tube in a cyclone separator. The apparatus is adapted for use with highly corrosive halide-containing gas-solids suspensions at elevated temperatures.

In accordance with this invention, a flanged, hollow nickel alloy gas outlet tube is provided with multiple inlets and outlets arranged circumferentially around a portion of the gas outlet tube. A hollow passage contained within said gas outlet tube is provided with a pair of partial longitudinal baffles positioned in such a manner that cooling air or other compatible cooling fluid may flow within the passage and be caused to flow longitudinally down the length of the tube, in one portion of the passage, before passing below the partial baffles and the flow back upwardly through the other portion of the passage. The flow of cooling air or other compatible cooling fluid is maintained such that sufficient heat transfer occurs to reduce the temperature of the surface of the gas outlet tube to a level below about 1100° F. to alleviate corrosion problems. In addition, a controlled quantity of non-volatile metal halides is deposited upon the exterior surface of the gas outlet tube, by sublimation, to further protect the nickel alloy from the highly corrosive environment.

5 Claims, 4 Drawing Figures

CYCLONE SEPARATOR FOR HIGH TEMPERATURE OPERATIONS WITH CORROSIVE GASES

BACKGROUND OF THE INVENTION

1. Field of the Invention

This invention relates to cyclone separators, and more particularly, to cyclone separators for use in high temperature operations with highly corrosive, halide-containing gases.

2. Description of the Prior Art

Cyclone separators comprise well known means for separating gases and solids from mixtures of the same. Such separators generally are constructed of the tubular or cylindrical-shaped main body connected to a lower tapered conical portion. A tangential side inlet is provided near the top of the cylindrical main body. A gas outlet tube is provided and generally extends downwardly through the cyclone top into the main body of the cyclone. The tube usually must extend down to a level slightly below the lowest portion of the inlet to assure efficient separation of solids and gases.

In operation solids-laden gases are introduced at high velocity through the tangential inlet. They follow a vortex shaped path around the outside of the gas outlet pipe downwardly towards the bottom of the separator. The solids are deposited along the walls be centrifgal force and separated from the gas. The separated gas then follows a vortex path upwardly and passes out of the top of the cyclone separator through the gas outlet tube. The separated solids flow through a solids outlet at the base of the tapered conical section.

In prior apparatus, for high temperature service, the cyclone interior and gas outlet pipe have been refractory-lined or coated with materials such as alumina, silica, magnesia, beryllia or silicon carbide. Such apparatus have failed to provide satisfactory results in continuous operations since stresses due to thermal gradients and differential thermal expansion cause the refractory to disintegrate or crumble.

In more recent apparatus, such as in U.S. Pat. Nos. 3,327,456 and 3,470,678, cyclones have been constructed using refractory coated hollow gas outlet tubes through which a cooling fluid such as steam or hydrocarbon gases is passed to decrease thermal stressing effects.

While U.S. Pat. No. 3,327,456 is an improvement over the prior art, certain difficulties have been encountered with the design. For example, when a cooler incoming steam or other coolant enters one of the multiple compartments, at the top, it tends to cool the metal in that region to quite low temperatures. As the coolant passes downwardly through the compartment, around the end of the baffle and back upwardly through an adjacent compartment, it is heated to higher and higher temperatures. As a result, the top of the adjacent compartment, where the fluid exits, is at a much higher temperature than the equivalent region at the top of the compartment into which the coolant was introduced. As a result, the outlet tube is subjected to quite severe stresses and strains due to the many sharp and sudden variations in temperature at adjacent points around the circumference of the tube. This also distorts the tub and can cause cracking of the refractory. It also puts a severe strain on the supporting members, which in the case of U.S. Pat. No. 3,327,456 are located inside the cyclone. Such a location is required in order to support the gas outlet tube (which consists of two metal tubes, the lower tube being hollow and both being coated with a refractory material). Further, maintenance upon such a design is considerably more difficult since the support mountings are inside the cyclone for the gas outlet tube.

U.S. Pat. No. 3,470,678 provides a further improvement over U.S. Pat. No. 3,327,456. In U.S. Pat. No. 3,470,678 a triannular, fluid-cooled refractory coated outlet tube is employed. The tube consists of three concentric passages or annular spaces formed from four concentric metal tubes to allow for the flow of coolant. The innermost and outmost metal tubes are coated with refractory to protect the metal from the high temperature gases and solids inside the cyclone. That design also has the disadvantage of increased weight due to the refractory coatings and multiple tube construction.

Special problems arise in the separation of gas-solids suspensions when the gas is a highly corrosive, halide-containing gas mixture and is at an elevated temperature, e.g., in the range of from about 1500° F. to 2400° F. such as the product off-gases from a titanium tetrachloride chlorinator.

In separating such gas-solids suspensions with gas outlet tubes coated with refractory material, both thermal stressing and corrosion result in failure of the gas outlet tube with a consequent decrease in the efficiency of the separator as a greater amount of a fine solid particles are allowed to escape with the separated gas.

Cooling of the refractory coated gas outlet tube to a degree wherein corrosion will be reduced can result in the deposition of solid non-volatile metal halides by sublimation upon both the interior and exterior surfaces of the gas outlet tube. The result of such uncontrolled deposition can be complete blockage of the gas outlet tube in some cases. Accumulations on the exterior of said gas outlet tube can also block gas-solids flow into the cyclone. Further, if a sufficient quantity accumulates such that gravity causes it to break away from the gas outlet tube and fall into the cyclone, blockage of the solids outlet can occur.

The corrosive action alone can eventually result in refractory disintegration. If the gas outlet tube is fluid colled, possibly cooling fluid itself could contaminate the mixture undergoing separation. The entry of cooling fluid into the interior of the separator presents two problems. In one instance, the cooling fluid could enter the solids outlet and be returned to the high temperature gas-solids source, such as a chlorinator, wherein an explosion could occur destroying the equipment and contaminating the atmosphere with highly corrosive, potentially poisonous gases. In the second instance, corrosive, halide-containing gases may contaminate the cooling fluid and cause destructive corrosion of the cooling system pumps, heat exchangers and storage facilities resulting in potential atmospheric contamination as well as economic losses.

Thus, it would be desirable to provide an apparatus wherein the difficulties previously described hereinbefore could be overcome, and further provide a design which provides ease of maintence and installation.

SUMMARY OF THE PRESENT INVENTION

The surprising discovery now has been made that a flanged, hollow, nickel alloy gas outlet tube of the design hereinafter described alleviates the problems normally experienced in separating highly corrosive, halide-containing gases and solids suspensions such as titanium tetrachloride chlorinator product off-gases containing chlorine, anhydrous hydrochloric acid and titanium tetrachloride through the use of air as a cooling fluid.

The gas outlet tube of this invention is hollow and comprised of a nickel alloy which is divided into two portions by a pair of equally spaced longitudinal partial baffles located in the hollow passage. Air flowing in a common manifold is introduced at several points within one portion of the gas outlet tube passage to flow longitudinally through the passage past the partial baffles and be removed from the second portion of the passage by multiple exits before entering a common exhaust manifold at the same end of the gas outlet tube as the entry location.

In the practice of the present invention hereinabove described, several advantages result. The problems of refractory disintegration on the gas outlet tube are eliminated as no refractory coating is present. Corrosion of the gas outlet is minimized through construction of the tube with a nickel alloy and maintaining the air flow through the hollow gas outlet tube passage such that the tube surface temperature is below about 1100° F. This relatively high gas outlet tube operating temperature has the additional advantage that the thickness of any layer of non-volatile metal halides that may be deposited from the gas-solids suspension will be minimized but the presence of such deposit will further insulate the gas outlet from the corrosive environment. Further, the utilization of air under positive pressure as the cooling fluid will eliminate any potential contamination as a result of gas outlet tube failure since any air leakage will remain inside the cyclone and pass therethrough along with the separated halide-containing gases. The cooling fluid can also comprise any other type of coolant which would be compatible with such a procedure as is described.

Still further, the flanged unitary construction provides a much simpler and lighter gas outlet tube design than heretofore known which results in easier installation and maintenance since the flanged support connection is outside the cyclone shell rather than supported internally as is the common practice when refractory materials are used.

DESCRIPTION OF THE PREFERRED EMBODIMENT

Figure 1:
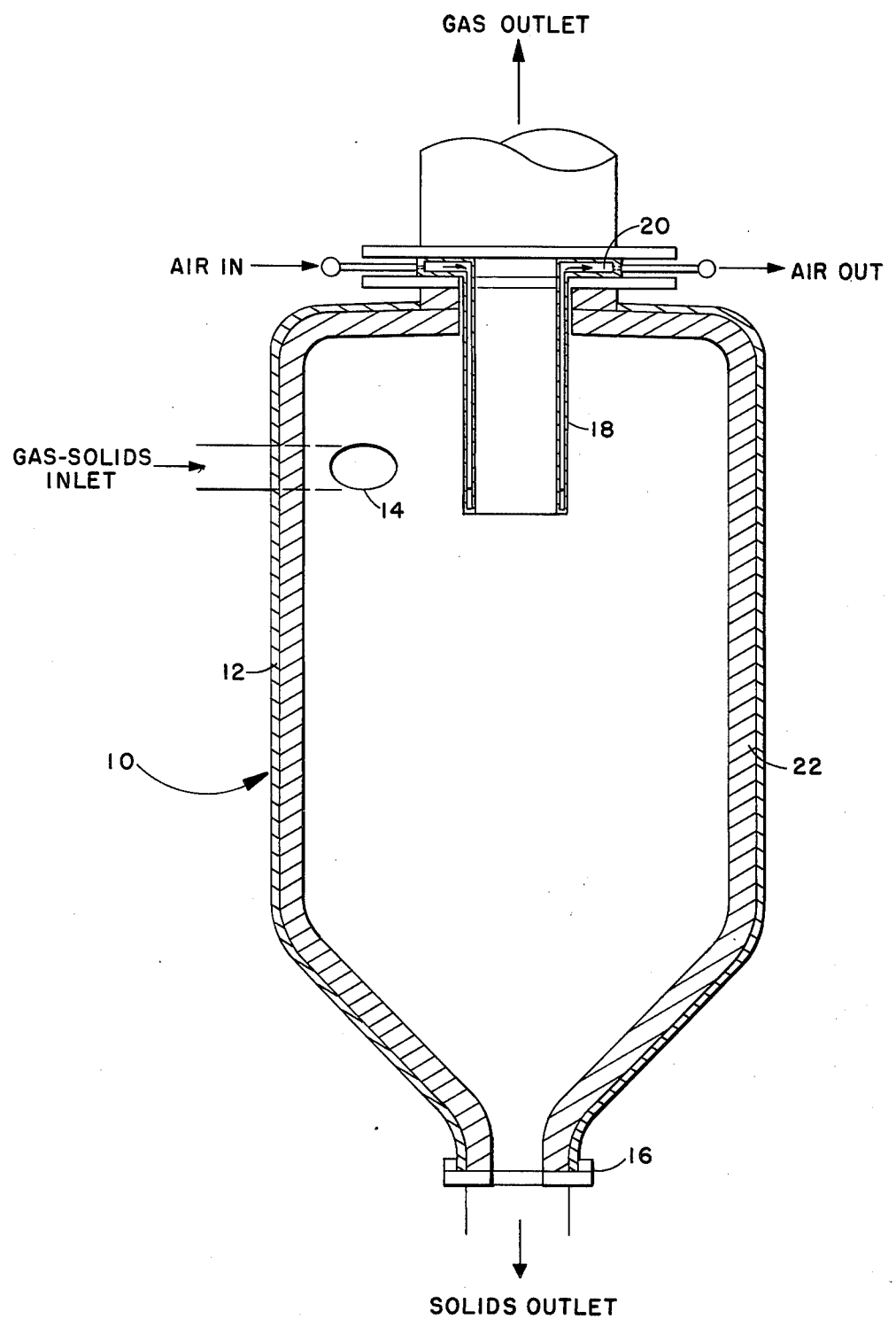
FIG. 1 is a vertical longitudinal cross-section of a cyclone separator embodying features of the present invention.

Turning now the the drawings, in FIG. 1, the general reference numeral 10 designates a cyclone separator 12 having a gas-solids inlet 14 in an upper portion of separator 12, a solids outlet 16 and a gas outlet tube 18. The gas outlet tube 18 is connected to separator 12 by means of a flange connection 20. The lower portion of separator 12 is conical in shape while the upper portion is cyclindrical in construction. The interior of separator 12 is lined with a refractory material 22.

In operation, the halide-containing gas-solids suspensions enters the upper portion of separator 12 through gas-solids inlet 14 at a temperature level in the range of from about 1500° F. to about 2400° F. at a high velocity. The suspension follows a vortex-shaped path down the refractory 22 towards the bottom of the separator. The solids are deposited along the walls by centrifugal force and separated from the gas. The separated halide-containing gas then follows a vortex-shaped path upwardly through the center of separator 12 and flows out through gas outlet tube 18.

Gas outlet tube 18 is designed in such a manner that it extends to a point within separator 12 below the level at which the gas-solids inlet 14 is located. thus, when a halide-containing, gas-solids suspension enters the separator 12, such as a product off-gas from a titanium tetrachloride chlorinator, the entering suspension is at least partially prevented from passing directly out of separator 12 through the gas outlet tube 18.

As mentioned previously, gas outlet tube 18 is subjected to high temperatures and a highly corrosive atmosphere which, in the past, has been a constant source of breakdowns within cyclone separators. To prevent this, the apparatus of the present invention is provided with a passageway for the circulation of air or any other compatible cooling fluid within the gas outlet tube 18 to cool the gas outlet to a temperature below about 1100° F. to alleviate many of the previously described problems as hereinbefore stated.

Figure 2:
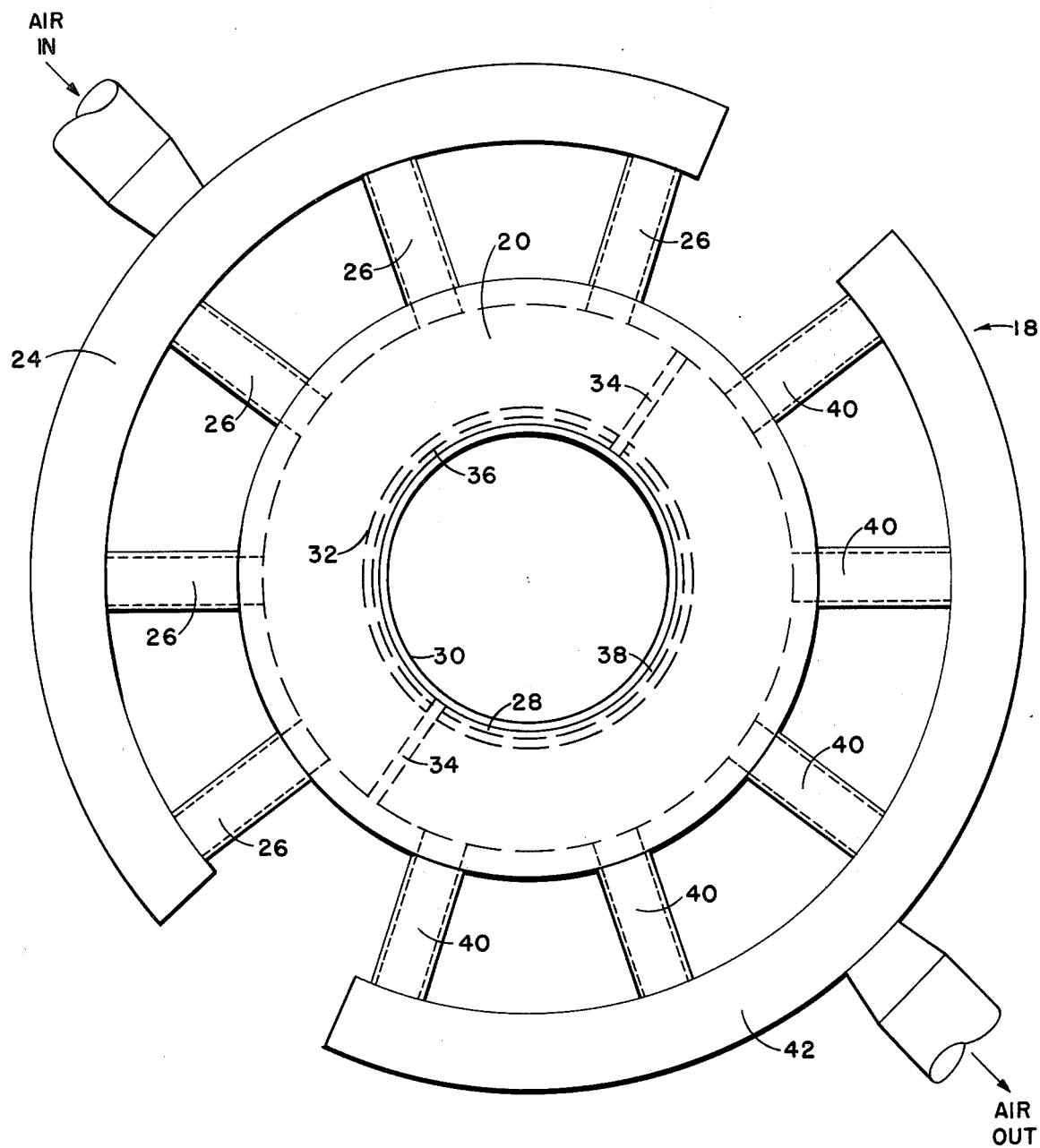
FIG. 2 is an enlarged top plan view of the gas outlet tube.

Turning now to FIG. 2, an enlarged top view of the gas outlet tube 18 is provided.

Air or any other compatible cooling fluid enters gas outlet tube 18 through a common inlet manifold 24 under positive pressure wherein the cooling air or other compatible fluid enters several inlets 26 located circumferentially around a hollow passage 28 formed by an inner wall 30 and an outer wall 32 comprising the exterior surfaces of gas outlet tube 18 and an upper flange 31 and a lower flange 33 comprising the flange connection 20 for gas outlet tube 18.

In passage 28 there are located two longitudinal partial baffles 34 which extend across the passage between inner wall 30 and outer wall 32 and upper flange 31 and lower flange 33 (see FIG. 3) to sealingly engage the upper portion of those walls, flange connection 20 and separate passage 28 into a first portion 36 and a second portion 38.

In operation, air or any other compatible cooling fluid enters the first portion 36 of passage 28 by inlets 26 located circumferentially around flange connection 20 and flows logitudinally downwardly through portion 36 to a point such that the cooling fluid passes beneath the partial baffles 34 to enter the second portion 38 of passage 28 in gas outlet tube 18. In second portion 38, the cooling fluid flows longitudinally upward through said portion to exit by outlets 40 located circumferentially around flange connection 20 in portion 38 of passage 28 in gas outlet tube 18 and be removed by a common air outlet manifold 42. The particular number of air inlets and outlets uniform air distribution is achieved within the hollow passage.

Figure 3:
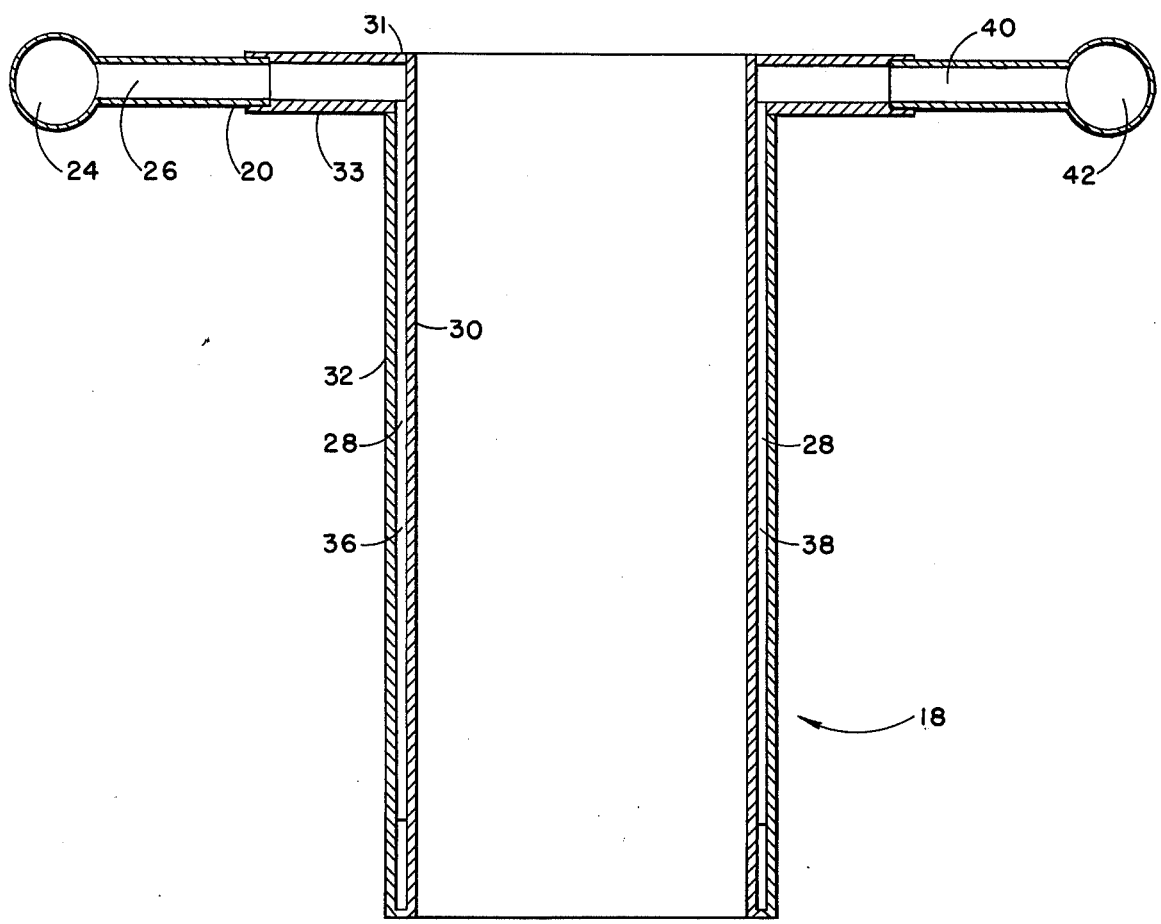
FIG. 3 is a detailed cross-section side view of the gas outlet tube.
Figure 4:
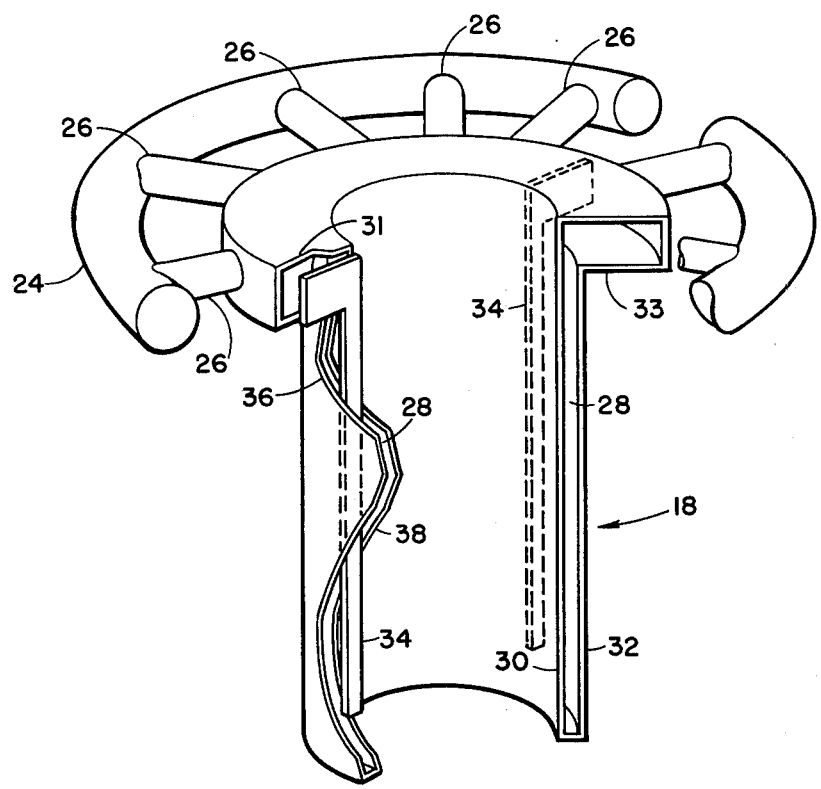
FIG. 4 is a schematic illustration, in partial cross-section and with parts broken away, illustrating the gas outlet tube of this invention.

Turning now to FIGS. 3 and 4, further details of the gas outlet tube 18 are shown to demonstrate the downward flow path of the cooling fluid through portion 36 of passage 28, past partial baffle 34 and upward return flow path in portion 38 of passage 28. In operation, the flow rate of cooling fluid through passage 28 in gas outlet tube 18 is such that the exterior surfacesof inner wall 30 and outer wall 32 of gas outlet tube 18 are maintained at a temperature level below about 1100° F. At this temperature, corrosion of the gas outlet tube is substantially alleviated and further, deposition of nonvolatile metal halides in the highly corrosive halide-containing gas-solids suspension is controlled such that a controlled sublimation of solids will occur to provide additional protection from the corrosive environment but eliminate the potential problem of substantial solids deposition which can cause equipment failure.

Further, maintaining such an elevated temperature results in less strain or distortion of the tube than if it were cooled to a lower temperature or contained multiple compartments producing multiple variations in the gas outlet tube wall temperature, as the cooling fluid passes therethrough.

Still further, any leakage of the cooling air contained in passage 28 into the interior of separator 12 will pass from the cyclone separator with the separated halide-containing gas through gas outlet tube 18 and thus will provide no pollution or contamination problems for the surrounding environment.

While the invention has been described in connection with the designated preferred specific embodiments, it is to be understood that the invention is capable of modification or variation without departing from the spirit or scope of the invention as defined by the appended claims.

What is claimed is:

1. In apparatus adapted for separating solids from admixture with corrosive halide-containing gases at elevated temperatures within a refractory lined cyclone separator provided with a solids-gas inlet, a solids outlet in a lower portion of said cyclone separator and a gas outlet in an upper portion of said cyclone separator, the entrance of said gas outlet being located below the solids-gas inlet, the improvements which comprise:
providing the gas outlet which is a non-refractory coated, flanged, hollow, nickel alloy gas outlet having an inner wall and an outer wall, said flange providing support for said gas outlet external of the interior of said refractory lined cyclone separator, said gas outlet being provided with multiple inlets and outlets for cooling fluid arranged around an upper portion of said gas outlet, a pair of partial baffles disposed between the inner and outer walls of said gas outlet to form a pair of communicating circumferential passages within said gas outlet, one of said passages being connected to the multiple inlets for said cooling fluid and the other of said passages being connected to the multiple outlets for said cooling fluid.

2. The apparatus of claim 1 wherein the surface of the gas outlet in contact with the corrosive halide-containing gas is adapted to receive a coating of said corrosive halide-containing gas deposited thereon in solid form.

3. The apparatus of claim 1 wherein the multiple inlets and outlets for cooling fluid in said gas outlet comprise a single connected inlet and connected outlet respectively.

4. The apparatus of claim 1 wherein the corrosive halide-containing gases are the product of chlorination of a titanium containing ore.

5. The apparatus of claim 1 wherein the cooling fluid is air.

* * * * *